(12) United States Patent
Jackson et al.

(10) Patent No.: US 7,295,667 B1
(45) Date of Patent: *Nov. 13, 2007

(54) TELECOMMUNICATIONS NETWORK SYSTEM AND METHOD

(75) Inventors: Michael Anthony Jackson, London (GB); Pamela Zave, Chatham, NJ (US)

(73) Assignee: AT&T Corp., New York, NY (US)

( * ) Notice: Subject to any disclaimer, the term of this patent is extended or adjusted under 35 U.S.C. 154(b) by 242 days.

This patent is subject to a terminal disclaimer.

(21) Appl. No.: 10/978,777

(22) Filed: Nov. 1, 2004

Related U.S. Application Data

(63) Continuation of application No. 10/165,928, filed on Jun. 10, 2002, now Pat. No. 6,826,275, which is a continuation of application No. 09/676,868, filed on Sep. 29, 2000, now Pat. No. 6,404,878, which is a continuation of application No. 09/034,681, filed on Mar. 4, 1998, now Pat. No. 6,160,883.

(51) Int. Cl.
*H04M 7/00* (2006.01)

(52) U.S. Cl. .................... 379/230; 379/221.01

(58) Field of Classification Search ............... 379/230, 379/221.01
See application file for complete search history.

(56) References Cited

U.S. PATENT DOCUMENTS

| | | | |
|---|---|---|---|
| 2004/0042607 A1* | 3/2004 | Gallant et al. | 379/220.01 |
| 2004/0057568 A1* | 3/2004 | Kawabata et al. | 379/220.01 |
| 2004/0081307 A1* | 4/2004 | Fujiwara et al. | 379/220.01 |
| 2004/0120497 A1* | 6/2004 | Stumer et al. | 379/220.01 |
| 2004/0131169 A1* | 7/2004 | Snip et al. | 379/219 |
| 2004/0141604 A1* | 7/2004 | Shaffer et al. | 379/201.02 |

* cited by examiner

*Primary Examiner*—Creighton Smith

(57) ABSTRACT

A telecommunications network system and method is presented incorporating a distributed feature composition (DFC) architecture, offering new technology for feature specification and composition. In the network architecture of the invention, customer calls are processed by dynamically assembled configurations of filter-like components: each component implements an applicable feature, and communicates with its neighbors by featureless internal calls that are connected by the underlying architectural substrate. Features are coherently accumulated, and the problem of feature interaction is rendered much more tractable.

24 Claims, 7 Drawing Sheets

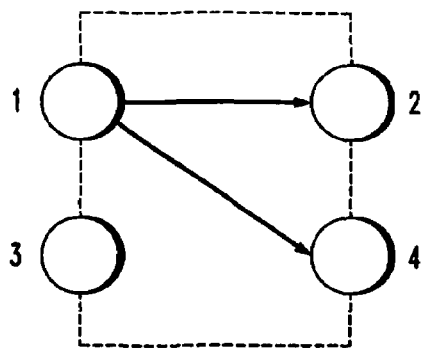
FIG. 7A
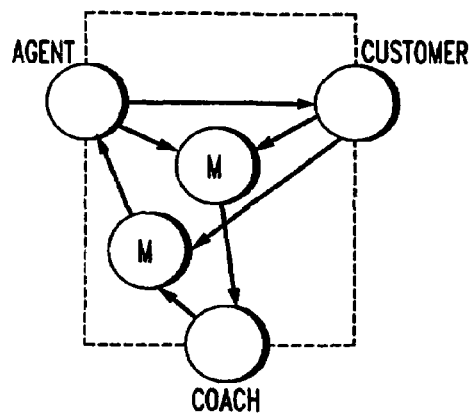
FIG. 7B
FIG. 8A
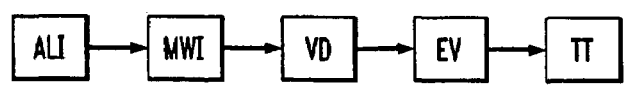
FIG. 8B
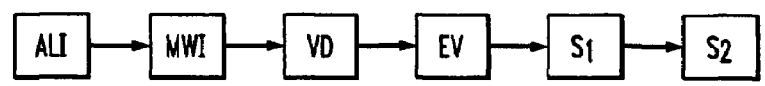

TELECOMMUNICATIONS NETWORK SYSTEM AND METHOD

This application is a continuation of application Ser. No. 10/165,928, filed on Jun. 10, 2002, and entitled "Telecommunications Network System and Method," which issued on Nov. 30, 2004 as U.S. Pat. No. 6,826,275, which is a continuation of U.S. patent application Ser. No. 09/676,868, filed Sep. 29, 2000, and entitled "Telecommunications Network System and Method," which issued on Jun. 11, 2002 as U.S. Pat. No. 6,404,878, which is a continuation of U.S. patent application Ser. No. 09/034,681, filed Mar. 4, 1998, and entitled "Telecommunications Network System and Method," which issued on Dec. 12, 2000 as U.S. Pat. No. 6,160,883.

BACKGROUND OF THE INVENTION

1. Field of Invention

The invention relates to telecommunications networks, and more particularly to advanced architectures for telephone networks.

2. Description of Related Art

The incremental, feature by feature extension of the calling features available to users of the telephone network has given rise to the %% ell known feature-interaction problem. As new options are added to the suite of call choices it becomes increasingly difficult to manage the behavioral complexity of the features and their resulting interactions. For instance, a telephone subscriber may subscribe to call waiting, caller ID, and 3-way calling features. What happens to that subscriber when a 3-way call is made, then interrupted by a call waiting signal, can be problematic. Redesign of old telephony features to fit smoothly with the range of new features is usually not a practical option. Eventually the resulting patchwork complexity damages the quality and productivity of all phases of telecommunications service and development. It is actually the case that if not for special layers of monitoring software that examine the states of local office switching systems (such as commercially available 5ESS) and compensate for errors, the mean time between failure in those switching systems would be measured in hours, rather than months or years.

The inventors themselves in earlier work have analyzed telephone systems and their burgeoning feature sets in terms of a general decomposition into a connection specification and specifications of each user interface (P. Zave and M. Jackson, "Requirements for Telecommunications Services: An Attack on Complexity", Proceedings of 3$^{rd}$ IEEE International Symposium on Requirements Engineering, IEEE Computer Society Press, pages 106-117, 1997). Each of those specifications aimed to allow for composition of the behavior due to each feature that could be relevant to the specification. That approach proved difficult, the fundamental difficulty lying in the complexity of combining the feature behaviors within each specification, and the difficulty of finding mechanisms that could handle that complexity.

Other approaches in the art trying to manage feature interactions have rested on an architectural foundation, for instance those described in J. M. Duran and J. Visser, "International Standards for Intelligent Networks", *IEEE Communications* XXX(2):34-42, February 1992; J. J. Garrahan, P. A. Russo, K. Kitami and R. Kung, "Intelligent Network Overview", *IEEE Communications* XXXI(3):30-36, March 1993; and J. Kamoun, "Formal Specification and Feature Interaction Detection in the Intelligent Network", Chapter 2, Department of Computer Science, University of Ottawa, Ottawa, Ontario, 1996.

In these approaches the applied architecture is that of the "Intelligent Network", or something closely related to it, which is a conceptual model oriented towards two-party calls. Features such as conferencing, call multiplexing, call queuing and others which connect or relate more than two parties present serious difficulties for such a conceptual model. Other architecture-based approaches known in the art include those reflected in I. Zibman, C. Woolf, P. O'Reilly, L. Strickland, D. Willis and J. Visser, "Minimizing Feature Interactions: An Architecture and Processing Model Approach" in K. E. Cheng and T. Ohta, editors, *Feature Interactions in Telecommunications Systems III*, IOS Press, Amsterdam, 1995, pages 65-83; M. Weiss and T. Gray, "Experiences with a Service Environment for Distributed Multimedia Applications" in P. Dini, R. Boutaba, and L. Logrippo, editors, *Feature Interactions in Telecommunication Networks IV*, IOS Press, Amsterdam, 1997, pages 242-253; W. J. Barr, T. Boyd and Y. Inoue, "The TINA Initiative", *IEEE Communications* XXXI(3): 70-76, March 1993; and N. D. Griffith and H. Velthuijsen, "The Negotiating Agents Approach to Runtime Feature Interaction Resolution" in L. G. Bouma and H. Velthuijsen, editors, *Feature Interactions in Telecommunications Systems*, IOS Press, Amsterdam, 1994, pages 217-235. In the latter known approaches the analytic architecture is more flexible than the Intelligent Network, being based on agents that interact by sending messages to each other as needed. Agents may model users, resources, connections and services; or, more abstractly, may negotiate on behalf of interested parties. In some cases, both styles of representation may be used.

In most of the known approaches call features are not regarded as first-class distinct components in the architecture. That idea however is found in other known approaches, for instance reflected in K. H. Braithwaite and J. M. Atlee, "Towards Automated Detection of Feature Interactions" in L. G. Bouma and H. Velthuijsen, editors, *Feature Interactions in Telecommunications Systems*, IOS Press, Amsterdam, 1994, pages 36-59; and K. P Pomakis and J. M. Atlee, "Reachability Analysis of Feature Interactions: A Progress Report", *Proceedings of the International Symposium on Software Testing and Analysis*, 216-223, January 1996, which characterize a feature as a stacked finite-state machine, in which the stack levels correspond to feature priority.

Other characterizations of telecommunication call features are also known in the art. In T. Ohta and Y. Harada, "Classification, Detection and Resolution of Service Interactions in Telecommunication Services" in L. G. Bouma and H. Velthuijsen, editors, *Feature Interactions in Telecommunications Systems*, IOS Press, Amsterdam, 1994, pages 60-72; and A. Gammelgaard and J. E. Kristensen, "Interaction Detection, a Logical Approach" in L. G. Bouma and H. Velthuijsen, editors, *Feature Interactions in Telecommunications Systems*, IOS Press, Amsterdam, 1994, pages 178-196, a feature is defined as a set of state-transition rules. In J. G. Thistle, R. P. Malhame, H.-H. Hoang, and S. Lafortune, "Feature Interaction Modelling, Detection and Resolution: A Supervisory Control Approach" in P. Dini, R. Boutaba, and L. Logrippo, editors, *Feature Interactions in Telecommunication Networks IV*, IOS Press, Amsterdam, 1997, pages 93-107, a feature is represented as a finite-state machine subject to supervisory control.

In M. Faci and L. Logrippo, "Specifying Features and Analyzing Their Interactions in a LOTOS Environment" in L. G. Bouma and H. Velthuijsen, editors, *Feature Interac-* tions in *Telecommunications Systems*, IOS Press, Amsterdam, 1994, pages 136-151; and K. E. Cheng, "Towards a Formal Model for Incremental Service Specification and Interaction Management Support" in L. G. Bouma and H. Velthuijsen, editors, *Feature Interactions in Telecommunications Systems*, IOS Press, Amsterdam, 1994, pages 152-166, a feature is a process in a process algebra. In J. Blom, B. Jonsson and L. Kempe, "Using Temporal Logic for Modular Specification of Telephone Services" in L. G. Bouma and H. Velthuijsen, editors, *Feature Interactions in Telecommunications Systems*, IOS Press, Amsterdam, 1994, pages 197-216; and P. Combes and S. Pickin, "Formalization of a User View of Network and Services for Feature Interaction Detection" in L. G. Bouma and H. Velthuijsen, editors, *Feature Interactions in Telecommunications Systems*, IOS Press, Amsterdam, 1994, pages 120-135, a feature is a set of rules in a temporal logic. F. J. Lin and Y. J. Lin, "A Building Block Approach to Detecting and Resolving Feature Interactions" in L. G. Bouma and H. Velthuijsen, editors, *Feature Interactions Telecommunications Systems*, IOS Press, Amsterdam, 1994, pages 86-119, also regard features as distinct components to be configured according to architectural constraints.

However, none of the known approaches to network feature management or specification effectively manage the basic feature interaction problem in the telephone network. A systematic approach for telephone network architecture which effectively and reliably manages all the permutations of call features, current and future, is fundamentally desirable.

SUMMARY OF THE INVENTION

The invention overcoming these and other problems in the art relates to a telecommunications network system and method which introduces a network technology, distributed feature composition (DFC), enabling efficient and stable telecommunications networks, including those capable of containing the feature-interaction problem. Using the invention, an existing menu of call features can be modified, extended or added to with consistency and much reduced chance of unexpected feature interference and system malfunction. The invention achieves these and other advantages in part by incorporating a virtual architecture for telecommunications systems within which a feature corresponds to a small number of component types, and in which a customer call is handled by building a configuration of components communicating by featureless internal calls through the communications network, connected by the underlying network substrate or architecture.

A desired new feature is specified by describing a small number of new component types, usually just one, along with clear rules for joining the components into configurations.

The architectural style of the invention has something in common with known dynamic pipe-and-filter technologies, in which the filters are the feature components and the pipes are the internal call connections between components. Filters are independent entities, each with its own state, sharing no state with other filters and independent of the identities of its neighbors, as known in the art. This independence contributes significantly to the ability of the invention to manage feature interactions. However, the invention expands on these notions and incorporates a full blown virtual architecture, offering possibilities for convenient mapping to typical physical network architectures.

BRIEF DESCRIPTION OF THE DRAWINGS

The invention will be described with reference to the accompanying drawings, in which like elements are designated by like numbers and in which:

FIGS. 7(a) and 7(b) illustrate complex voice processing within feature boxes according to the invention;

FIGS. 8(a) and 8(b) illustrate further usage configurations according to the invention.

DETAILED DESCRIPTION OF THE DRAWINGS

In the system and method for a telecommunications network of the invention, a fundamental construction is to treat call features as independent boxes through which calls are routed from caller to callee. The routing of a call reflects the features to be accumulated and applied to it.

Figure 1:
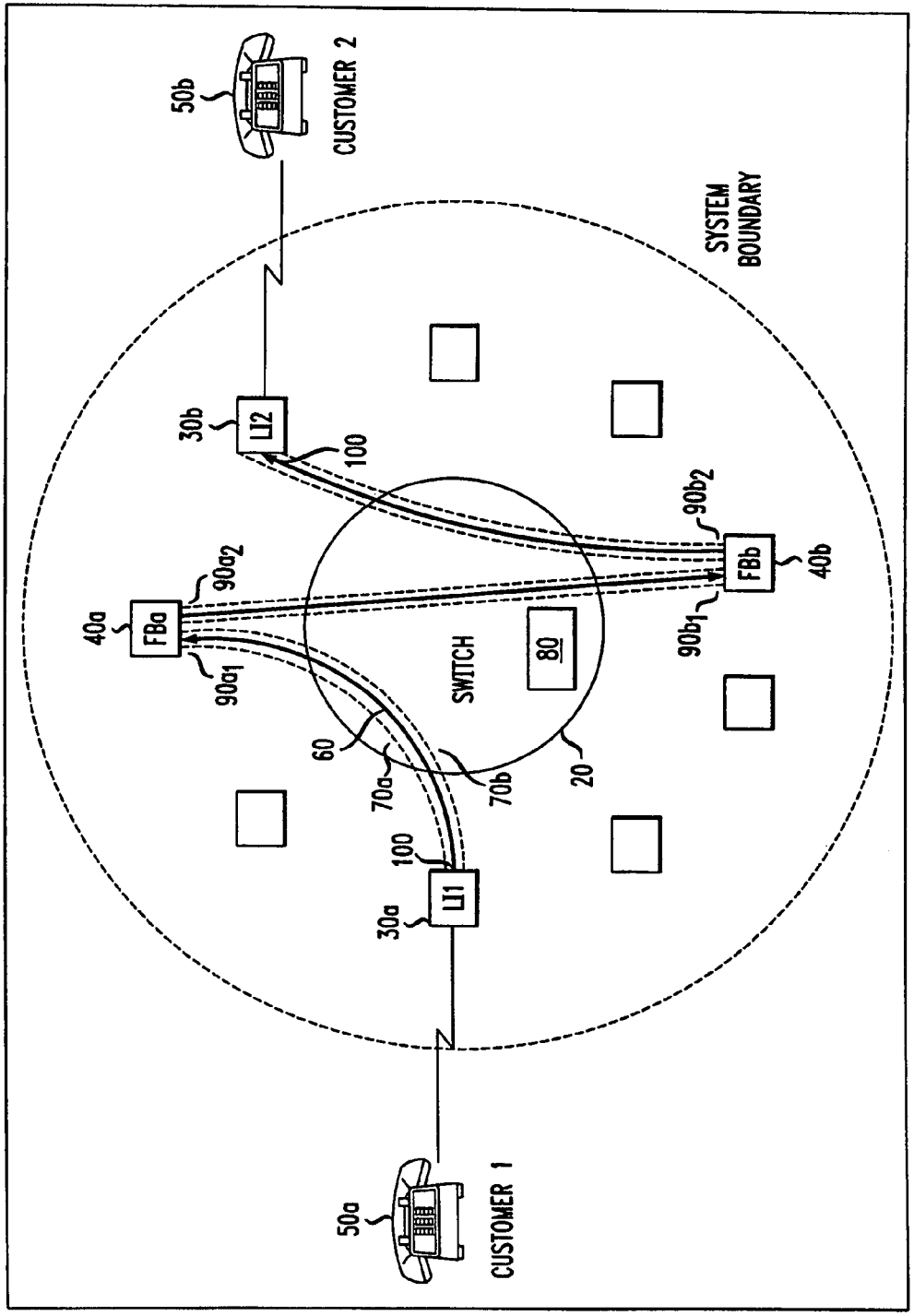
FIG. 1 illustrates a snapshot of a usage in a telecommunications network according to the invention in which two customers are talking.

As illustrated generally in FIG. 1, the invention is illustratively described in terms of a telephone network. The telephone network has a virtual switch 20 that serves its customers through line interface boxes (30a and 30b) at its periphery. Call features are provided by feature boxes (40a and 40b), interposed between a calling and a callee customer.

The term "call" is used chiefly to denote these internal featureless calls. Episodes of customer service, usually referred to as calls, will be referred to as "customer calls" or "usages". The terms "caller" and "callee" will be used to denote the boxes placing and accepting internal calls. Where there is no ambiguity the terms "call". "caller" and "callee" will be used for a customer call and its originating and terminating customers.

FIG. 1 shows a snapshot of a network architecture according to the invention in a state in which two customers are talking. The customers' telephones 50a and 50b are connected to the system at the line interface boxes 30a (LI1) and 30b (LI2), respectively. Two features have been illustratively applied to this usage, provided by the feature boxes 40a (FBa) and 40b (FBb). The arrows in the diagram show the routing of calls and the directions in which they were placed. Customer 1's original request was routed as a call from LI1 30a to Fba 40a. Fba 40a then placed a call that was routed to FBb 40b. FBb 40b placed a call that was finally routed to Customer 2's line interface box LI2 30b. The switch 20 therefore carries three internal calls in providing the connection between Customer 1 and Customer 2.

Each call is carried by a two-way voice channel 60 and two signaling channels 70a and 70b, one in each direction. To complete the connection between LI 30a and LI2 30b, the feature boxes Fba 40a and FBb 40b join the voice 60 and signaling channels 70a and 70b of the calls in which they are participating. In general, a feature box has full control over the calls to which it is connected. A feature box can coordinate voice channels in any way desired, freely joining and separating voice signals, playing announcements and tones, recording speech, and monitoring in-band signals. Similarly, it can control the out-of-band signaling of its calls by suppressing or passing on messages and by introducing new messages of its own.

A feature box is configured into each usage in which it may possibly be needed. For example, Fba 40*a* may be an Originating Call Screening (OCS) box, and FBb 40*b* a Call Forwarding on Busy (CFB) box, configured into the usage by a router 80 simply because Customer 1 subscribes to OCS and Customer 2 to CFB. If the number dialed by. Customer 1 is not in the provisioned screening list, the OCS feature box Fba 40*a* will behave transparently, the usage proceeding as if the box were not present; similarly, if Customer 2 is not busy, the CFB box FBb 40*b* will behave transparently. This transparent behavior of feature boxes is a factor contributing to their independence, and to the freedom with which they can be combined and inserted into usages.

The routing of calls from box to box within the system is the responsibility of the router 80 embedded in the switch 20. The first internal call in a usage is typically placed by the originating customer's line interface box. The box sends the switch a setup message containing an empty routing list and four fields: a source field (whose value is the DN, dialed number, of the originating customer); a dialed-string field; an empty target field; and a command field with an associated modifier (which in this case would specify that a new routing list vas to be constructed). The router 80 may assign a value to the target field from the dialed string and then uses the four field values, together with information about customer subscriptions and features, to construct a routing list for the usage. This list is then inserted into the setup message for dispatch to the switch and onward transmission.

To dispatch a call, the router 80 truncates the routing list by removing its head entry, and requests the switch 20 to connect the call to the box specified in that entry. A box that receives a call receives the truncated setup message. In many cases, once that call has been set up, the box will then place a second call whose setup message is a copy of the first. When the switch 20 receives this second setup message, the router 80 again truncates the routing list and the switch connects the second call to the appropriate box. In this way a chain of calls is formed until eventually the routing list is empty and the last call is routed to the line interface box of its final target.

Figure 2:
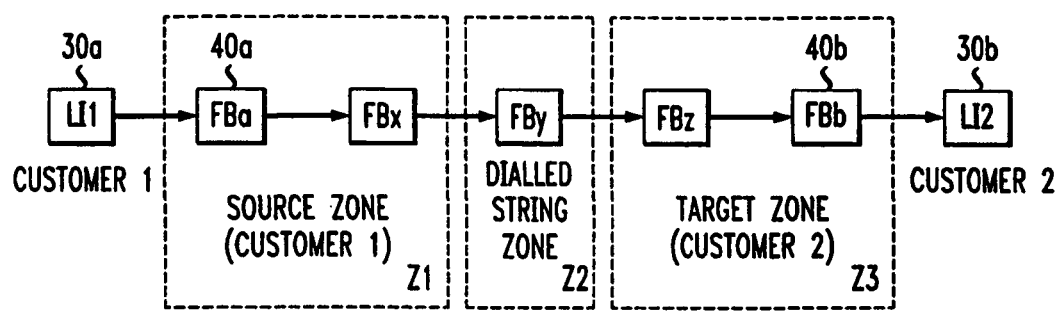
FIG. 2 illustrates feature zones in a usage according to the invention.

In the invention, features are selected by the router in three zones: features applicable to the Source caller (zone "Source"); features applicable to the Dialed string (zone "Dialed"); and features applicable to the Target callee (zone "Target"). Roughly, the three zones correspond to three logical subchains in the construction of a usage, as illustrated in FIG. 2 (Z1, Z2, Z3).

The applicable feature boxes are specified in the routing list field of the setup message in zone order. The routing list specifies first the appropriate source zone feature boxes, such as OCS, then the appropriate dialed zone feature boxes, such as Collect (which may be invoked by the prefix '0' in the dialed string), and finally the appropriate target zone callee feature boxes, such as CFB. Within each of the three zones Z1, Z2, Z3 the feature boxes appear in the precedence order given by their feature specifications.

The router 80 itself uses three sets of global data: subscription, specification and configuration data. All of this data takes the form of relations. Subscription and specification data (with one exception) is partitioned by feature, each relational tuple being associated with just one feature. Subscription data records customer choices to subscribe to optional features, such as OCS and CFB. All subscription data is statically provisioned. Some features are compulsory (for example, the Emergency Break-In feature (EBI) which allows emergency service officials to break into an existing conversation). All customers are considered to subscribe (albeit gratis) to such features, and these subscriptions too are recorded in subscription data.

The feature specification data records the general external specifications of individual features: that is, their relationships to usages and to each other but not the behaviors of the feature boxes that provide them. These general specifications describe the applicability of each feature, identify the box types that provide it, and define a precedence order (not partitioned by feature) in which feature boxes are configured into a usage.

It is intended in the practice of the invention that future features may be freely added to the overall telecommunications network, and feature specification data for those features be smoothly added when features are introduced or modified.

The configuration data records the set of boxes that exist in the system, the directory number (DN) of each line interface box, and the internal addresses used for interface and feature boxes. This data provides a part of the underlying mechanism for routing, but does not affect the selection of feature box types to be configured into usages.

Besides routing data, the invention uses another global set of data. This is feature operational data, most of which is provided by customers and accessed only for reading by the features that use it: for example, a forwarding number for CFB is provided by the customer and read by a CFB feature box. Some of this data may be written and read by different boxes cooperating to provide one feature: for example, the Automatic CallBack (ACB) feature is provided by one box that stores the caller ID for an unanswered call, and another box that later places a return call at the callee's request. Feature operational data is partitioned by features. The data for each feature is thus fully independent of other features.

The local state of a feature box may contain data in any necessary form. For example, a Collect feature may allow the caller to record a request that the callee pay for the call: the feature box can hold this recorded request as internal data for subsequent playback to the callee.

In general, in the practice of the invention, the behavior of the router 80 will not be so simple as the sketch introducing router actions above. A more detailed description of routing behavior is given below. Some straightforward deviations from the simple sketch are noted here:

Often the target DN cannot be determined from the original dialed string. If the customer is using the Speed Calling (SC) feature, the target DN must be obtained by the SC feature box from the SC feature operational data. If the customer is using the Sequence Credit Card Calling (SCCC) feature, the target DN for follow-on calls must be collected by the SCCC feature box from digits dialed by the customer during the usage.

Some features may use the command field of the setup message to change the routing. The Call Forwarding Always (CFA) feature changes the target before the original callee is reached. This change will require reselection of the callee features and hence reconstruction of the unused part of the routing list. A usage resulting from this kind of feature behavior can be regarded as composed of segments, each segment having its own "Source", "Dialed" and "Target" zones.

Not all usages can be depicted by linear graphs. A usage may fork as a result of a customer service request during the usage. A customer who subscribes to 3-Way Calling (3WC) can flash and dial digits to request connection to a third party while maintaining an existing connection to another customer. Joins, too, can occur. For example, the Call Waiting (CW) feature joins a new caller customer into an existing connection.

Although routing can be complex, as indicated above, it does not encroach on the functions of the feature boxes. In particular, routing activity does not access the feature operational data. For example, when the subscription data shows that a callee customer subscribes to CFA, the router merely inserts a CFA box into the usage, and does not examine the operational data and re-route the call to the provisioned CFA destination. Similarly, for a customer subscribing to OCS the router inserts an OCS box into the usage the router does not examine the dialed string and abort the call if the called number is in the OCS customer's screening list.

In terms of connections, calls are connected between named ports of boxes. Each internal call that is active at a line interface or feature box requires a dedicated port of that box. In FIG. 1, each of FBa and FBb has two active calls; each therefore must have at least two ports $90a_1$ and $90a_2$, and $90b_1$ and $90b_2$. A 3WC (Three-Way Calling) box must have three ports. A feature box providing Large-Scale Conferencing (LSC) for up to 10 participants must have at least 11 ports: one for each participant and one for the operator. Each port of a box is statically typed as a callee, caller, or dual port. A callee port can only receive calls, while a caller port can only place calls and a dual port can play either role.

A line interface box communicates through the network substrate with other boxes, making and receiving calls on behalf of the customer it serves. It can participate in only one internal call at any time, any multiplexing being handled by boxes that provide call multiplexing features such as CW or 3WC. A line interface box therefore has exactly one port 100, of the dual type. Obviously the interface box must also interact with its own customer line, but these interactions are not constrained by the architecture of the invention. Rather, they obey the native protocol of the external line or trunk. Since these interactions are not internal calls they do not require a DFC port.

Figure 6:
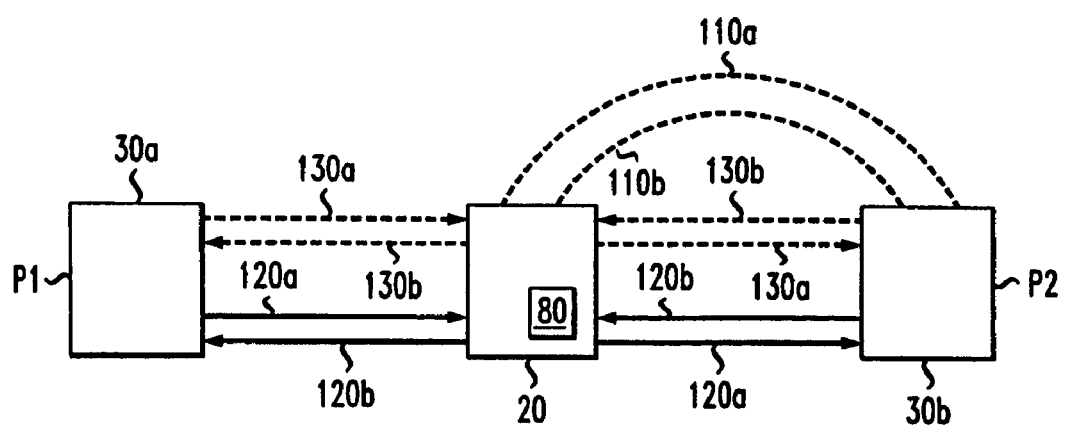
FIG. 6 illustrates the porting of a connected call according to the invention.

As more particularly illustrated in FIG. 6, calls are carried by the network substrate, which consists of the switch 20, its embedded router 80, and numerous constituent voice and signaling channels. Each active port in the system, in FIG. 6 illustrated as P1 and P2, is communicating with one port of another box by two-way voice channel 120a and 120b, and with the switch by two reliable FIFO signaling channels 130a and 130b. In addition, each box that has a callee or dual port (and can therefore receive calls) 30b is connected to the switch 20 by a pair of reliable FIFO signaling channels 110a and 110b that are associated with the box itself and not with any port.

Each call is initiated by a dual or caller port of a box sending a setup message to the router. The router 80 determines the callee box 30b for the call, and the switch 20 forwards the message to that box using channel 110a. The callee box 30b might have no idle callee or dual port at which to receive the call, in which case it responds with a quickbusy message on channel 110b and the call attempt has failed.

Alternatively, the box might accept the call. In this case callee box-30b reserves an idle callee or dual port for the call, and returns a reserve message on channel 110b that names the chosen port in a data field. Upon receiving the reserve message, the switch 20 informs the caller and callee ports, and provides a two-way voice channel 120a and 120b between them. If every feature box in a linear usage connects its incoming and outgoing voice channels, an unbroken voice path is formed between the originating and terminating customer lines.

Either port can end a call by sending a teardown message. The switch 20 will respond by disconnecting the voice channel. The teardown phase of the call protocol ensures that both ports are disconnected from the switch 20 and their signaling channels are flushed. When a call has been set up between two ports, either participating port can send status messages, and the switch 20 will forward them to the other port. For example, the callee port can send a status message indicating that the target destination is busy, or is alerting. The set of possible status messages can be easily extended to meet the needs of new features.

Messages sent by port P1on its signaling channels 130a and 130b are typically passed from box to box along the chain formed by their configuration into a usage. As a result, the precedence ordering of features and appropriate design of feature boxes can be used to resolve any conflict among boxes awaiting the same signal.

For example, a customer who subscribes to both CFB and Callee Messaging-on-Busy (CMB) may encounter a conflict between the two feature boxes: if an incoming call arrives while the customer is busy, CFB must redirect the call to another DN, while CMB must invite the caller to leave a voicemail message. In the DFC architecture of the invention, busy status is signaled out-of-band. A busy signal is sent from the customer's line interface box, and whichever of the two feature boxes CFB and CMB is closer to the LI box will receive the busy signal, act on it, and not propagate it further back in the chain. The more distant feature box will not receive the signal at all. Feature precedence determines how the conflict will be resolved.

Conflicts in respect of in-band signals are not so easily resolved. If the LI box were to signal its busy status by emitting an in-band tone, both feature boxes could detect the tone. The conflict might then be resolved by the outcome of a race, with all its attendant difficulties as appreciated in the art. For the most part, then, it is preferred to rely on out-of-band status messages. They have the further advantage that they can carry additional information in the message data fields.

One might jump to the conclusion that all voice analysis and generation functions should be performed at line interfaces, so that feature boxes would handle only out-of-band signals. But this is not feasible, because a system's full repertoire of tones, announcements and recognition vocabularies cannot be anticipated. The invention therefore employs a compromise in that respect, in which line interface boxes translate the most common in-band signals to and from out-of-band signals. Where feature box processing of in-band signals is inescapable, it is sometimes possible to avoid race conditions, as described below.

The regime of out-of-band status messages has significant consequences for the specification of line interface boxes. Each LI box translates between its own particular line protocol and the protocol of the overall virtual network. This translation must include translation from status messages to tones familiar to the human customer. For example, on receiving a busy status message, a calling customer's LI box must place a busy tone on the outgoing voice channel of its line so that the customer can hear it. Similarly, when the customer dials a digit during a call, the LI box must translate the in-band DTMF tone to an out-of-band signal.

The protocol employed in the invention accommodates, but does not necessarily define, a wide range of status message patterns that a LI box must translate into tones. For example, a user of SCCC can make a sequence of customer calls within one usage, dialing '#' instead of going onhook at the end of each call except the last. The subscriber's LI box must produce the appropriate tones—alerting, busy, unobtainable—during each call, mute the alerting tone when a callee answers, and produce dialtone when '#' is dialed. These tones must be produced by the LI box in response to messages sent or passed back by the SCCC feature box. Because a LI box must accommodate sequences of calls, as in the SCCC feature, it never interprets a tone message as a disconnect.

A LI box that receives a setup message when its one port is already active returns a quickbusy message. The box whose call attempt has failed will typically pass back a busy status message that eventually reaches the calling customer's LI box, where it will be translated into a busy tone on the line. A LI box that sends a setup message and receives an immediate quickbusy message in response must translate this quickbusy message into a busy tone on the line. (In practice this will occur infrequently: a setup message sent by a LI box will be routed first to a feature box that will be able to accept the call.)

Like conference bridges in a conventional physical architecture, feature boxes in the architecture of the invention are regarded as permanent, named individuals. At any particular time, a feature box may be occupied or available. When a feature is to be inserted into a usage, an available box of the right type is found, and the switch 20 sends the setup message to that box. It is assumed that the population of feature boxes is effectively unlimited: an available box of the right type can always be found when one is needed. A box may be occupied although it is not currently participating in any call. For example, a box providing a messaging feature may try to deliver a caller's recorded voice message at regular intervals until the intended recipient customer answers the phone. Between attempts, the box is not available: it is occupied waiting for the current interval to elapse before it makes a further attempt.

For many features (such as OCS) any available box of the appropriate type may be selected when one is required. Such boxes are called free boxes, because they may be freely selected. Some features (such as Call Waiting, CW) do not offer this freedom. To provide CW service, a CW box must be inserted into each usage of the subscribing customer. Any incoming call that arrives while the usage is in progress must then be directed to that particular CW box. Only in this way can the new call be joined into the existing usage.

To handle this kind of requirement conveniently, in the invention the CW box is classified as a bound box: it is bound to the line interface of the subscribing customer. Whenever that customer makes or receives a call, the particular CW box bound to that customer will appear in the routing list. Essentially, the class of bound boxes is the class of boxes at which a join can occur.

In addition to free and bound boxes the invention provides a third class. Some features are directly addressable by customers through the standard dialing plan. For example, in a Large-Scale Conferencing (LSC) feature, intended participants in a conference may be informed of a special DN to call; the feature box at that DN connects them into the conference after checking a password. Boxes implementing such features are addressable boxes.

In this specification, a notation is used which is convenient for the purpose in hand, connecting formal descriptions by informal narrative. Relations are written to indicate their types, in the Z style, by distinctive arrow symbols (such as →for a total surjection), as is known in the art. See, e.g., J. M. Spivey, "The Z Notation: A Reference Manual", Prentice-Hall International 1989, pages 95-109, incorporated by reference. Relations are also used as sets of pairs, and vice versa, wherever it is convenient to do so.

The basic sets of the configuration are these disjoint sets: [LIBox, FFBox, BFBox, AFBox, FFBType, BFBType, AFBType, Port, DN]. They represent, respectively: the set of LI boxes; the sets of free, bound and addressable feature boxes; the sets of free, bound and addressable feature box types; the set of ports; and the set of well-formed directory numbers. Two further sets, the set of all feature boxes and the set of all boxes, are defined from these basic sets:

FBox≙FFBox∪BFBox ∪AFBox; Box≙FBox∪LIBox;

Each port belongs to one box and each box has at least one port:

portBox: Port→▶Box

Each LI box and each addressable feature box has a unique DN:

LIbDnum: LIBox↣→DN; AFbDnum: AFBox↣→DN;
ran LIbDnum∩ran AFbDnum=∅;

Each bound feature box is bound to exactly one LI box:

boundLI: BFBox→LIBox;

Each feature box has an appropriate (free, bound or addressable) type, and each type has boxes:

freeType:   FFBox—▶FFBType;   boundType: BFBox—▶BFBType;

addrType: AFBox—▶AFBType;

The additional basic sets for specification data are [Featr, Zone]. They are the set of zones {"Source", "Dialed", "Target"}; they are disjoint from each other and from all other basic sets.

The set FBoxType of all feature box types of any class is defined; each box type provides all or part of one feature, and each feature is provided by at least one box type (a feature may be provided by two or more cooperating boxes of different types):

FBoxType≙FFBType∪BFBType∪AFBType; provFeatr: FBoxType—▶Featr,

A feature may be associated with more than one zone: for example, 3WC and CW are used in both the outgoing and the incoming calls of their subscribers, and therefore belong to both source and target zones. The association of features with zones is therefore many-to-many. However, this association plays no direct part in the formal description of a network according to the invention. Instead, the important association is of feature box types with zones.

For each box type there is specified whether it is a source, target or dialed feature box, or more than one of these. (An example of a feature box type associated with more than one zone is a CW feature box: the same type is used for CW on an outgoing customer call as on an incoming call.) Each box type is associated with at least one zone:

boxZone: FBoxType↔Zone; ∀t:FBoxType•t∈dom boxZone

No bound box type is in the dialed zone:

BFBType◁boxZone▷{"Dialed"}=∅;

But every addressable box type is only in the dialed zone:

boxZone (AFBType)={"Dialed"};

An element (f, "Source") or (f, "Target") of the boxZone given above indicates that a feature box type f may be applied to a customer call as a source or target zone. Whether it will be so applied to calls made by particular customers is determined by subscription data, as described below. For dialed features, the determination depends on specification data: a relation between sets of strings—for example, all strings beginning with "0"—and feature box types:

dialSetFBType: P String⟶FBoxType;
ran dialSetFBType=boxZone~({"Dialed"});

The basic set String is the set of strings over the symbols Char=('0' ... '9', '*', '=') that can be dialed. The relation dialSetFBType is given, tuple by tuple, in the specification of the features provided by the boxes (the sets of strings being specified by predicates over strings). One string may cause selection of more than more than one feature box type. For purposes of explanation it is more convenient to relate strings to feature box types directly:

stringFBType: String↔FBoxType;
∀s: String, f: FBoxType•(s,f)∈stringFBType⟺∃ss•s∈
  ˆ(ss, f) ∈dialSetFBType;

Selection of a box to provide a source or target feature is governed by boxZone, is by the source or target field in the setup message, and by the relation subscrip in the subscription data. Selection of a box to provide a dialed feature is governed by boxZone, by the dialed-string field in the setup message, and by the relation stringFBType in the specification data.

Ordering of feature boxes in a routing list is constrained by a specified precedence relation:

boxPrec: boxZone↔boxZone;

The pair ((fb1,z1), (fb2,z2)) is an element of boxPrec iff in any routing list containing both a box of type fb1 applied as a z1 feature and a box of type fb2 applied as a z2 feature the fb1 box must precede the fb2 box. boxPrec must be a partial order.

The specified precedence applies to routing lists as constructed by the router 80 and held in setup messages, not to usages. Because usages can be forked and joined, and a new routing list can be constructed for a partially complete usage, the order of boxes in usages is less constrained than their order in routing lists. The informal concept of a segment corresponds to the part of a usage in which the feature box order must conform to the precedence specified by boxPrec.

Since feature boxes are placed in the routing list in the order source, dialed, target, boxPrec must also satisfy:

fb1 fb2: FBoxType, z1, z2: Zone•
  ((fb1,z1), (fb2,z2))∈boxPrec⟹(z1="Source")∨(z2="Target")∨(z1=z2);

In the implementation of the invention, a subscriber subscribes to features, ensuring that the appropriate feature boxes are applied to the subscribers calls in the appropriate zones. However, the effect of a subscription may be different for different subscribers. For example, the Emergency Break-In (EBI) feature is used by privileged emergency subscribers to place calls that will reach even a busy telephone; normal customers are compelled to receive such break-in calls when they are engaged in an outgoing or incoming call of their own. The emergency service subscribes to EBI in the source zone; the normal customer subscribes, compulsorily, in both source and target zones. EBI is provided by two feature box types: a source zone free box for the emergency service, and a source and target zone bound box for the normal customer.

The process of setting up subscriptions to features is not detailed herein, and subscriptions are regarded simply as subscriptions to feature boxes in zones. The basic sets [FBoxType,Zone] were introduced above. The subscription data is the relation subscrip, between DNs and (FBoxType, Zone) pairs. Since the relation boxZone is precisely the set of such pairs (t, z) in which box type t is associated with zone z, there results:

subscrip: DN↔(boxZone⊳{"Source", "Target"});

The relation subscrip governs only features in the source and target zones; applicability of features in the dialed zone is governed by the relation dialSetFBType described above.

The configuration data relation boundLi given above is constrained by subscrip. If the customer at DN d subscribes to a bound boxtype t, then there, ust be exactly one box of type t bound to the LI at d. The constraint is:

∀d: DN, i: LIBox, t: BFBType•
  (i LIbDnum d∧f∈dom subscrip(d))⟹(∃!b•b boundLI
    i∧b boundType t);

Feature operational data consists of a set of relations [OpemRe1]. Each of these relations supports one feature; some features may be supported by more than one relation, some by none:

suppFeatr: OpemRe1→Featr;

Each relation is accessible only to feature boxes of the types that provide the feature supported by the data. This constraint contributes importantly to feature independence:

boxRe1:                    FBoxType↔OpemRe1;
  boxRe1=provFeatr=suppFeatr~;

A setup message is sent from a calling box to the switch 20. The router 80 embedded in the switch 20 modifies the message contents before the switch transmits the message to a callee box; typically, that box will create another setup message by copying all or part of the first message, and send it in turn to the switch.

The full structure of the setup message is:

setup=(source, target: DN∪nul;
dialed: String∪nul;
route: (seq boxZone)∪nul;
command: {"new", "update", "continue", "direct"};
modifier: P Zone∪FBoxType∪nul);

the command field and its modifier are set by the sending box to control the action of the router.

In a setup message sent by an LI box: source=DN of the LI; target=nul; dialed=the dialed string; route=nul; command="new" and modifier=nul.

In setup messages sent by feature boxes many combinations of values are possible; they must conform to the constraints described in the next section. Further, a box may not access the route component except to set it to nul or to the value in an incoming setup message previously received by the box.

Initially the router 80 examines the values of target and dialed. If dialed≠nul and target=nul, the router 80 sets a value in target derived from dialed according to the dialing plan; this value may be nul when the dialed string does not indicate a target DN (for example, if the dialed string is a speed-calling code, or an 800-number).

Then, after acting on the value of command, as described in this section, the router 80 determines the destination box to which the message should be sent by the switch, as described, below.

If command="new", the router 80 computes a new routing list, as explained below, for all three zones Z1, Z2, Z3, and inserts it into route.

If command="update", then modifier=a subset of {"Source", "Target", "Dialed"} and route≠nul. The router 80 computes a new routing list for each zone specified in modifier, and uses it to replace the existing value of route for each of those zones.

If command="continue", then route≠nul; modifier is ignored. The router leaves the existing value of route unchanged.

If command="direct", then modifier=bt, where bt is a box type providing the same feature f as the box that sent the setup message, and target=dn, where dn is a subscriber to bt in zone "Target". The router replaces the existing value of route with the singleton sequence ((bt, "Target")>.

Each zone of the routing list is computed as follows:

For zone "Source" or "Target" the list is empty if source or target respectively is nul. Otherwise the list contains those box types of the zone that provide subscribed to by the source or target respectively. For "Source" and "Target" these are the following subset of boxZone:

(subscrip(source))▷{"Source"} and (subscrip(target))▷{"Target"}

For zone "Dialed" the list is empty if dialed=nul. Otherwise the list contains the following subset of boxZone:

(stringFBType(dialed))◁boxZone

The set stringFBType(dialed) is the set of dialed zone feature boxes to be applied to the string dialed.

The complete routing list value set in route satisfies the precedence relation boxPrec.

In terms of routing, after resetting target and route as described above, the router 80 chooses the destination box b as follows:

If route is empty, b is chosen according to the value of target as follows:
  If target is not the DN of any LI box or addressable feature box, then b is an available Dialing Error Response (DER) feature box (a free box).
  If target∈LIbDnum then b=LIbDnum~(target).
  If target∈AFbDnum then b=AFbDnum~(target).

If route is not empty, the head element is (t, z) of type FBoxType×Zone.

This element is removed from the route list, and used to choose b as follows:
  If t∈FFBType then b is an available box of type t.
  If t∈BFBType then b is the box of type t bound to LIbNum-(source) if z="Source" and to LIbNum~(target) if z="Target". If no such box exists, then b is any available Dialing Error Response (DER) feature box (a free box).

After the router 80 has modified the setup message and determined b, the switch transmits the modified setup message to the chosen box.

Illustrative message types for internal calls are shown in Table 1, along with their fields senders and recipients.

TABLE 1

Message Types According to Call Protocol of Invention

| Phase | Message Type | Data Fields | From/To |
|---|---|---|---|
| Setup & teardown phase messages | setup | (see routing discussion) | caller to box |
| | quickbusy | none | box to caller |
| | reserve | reserved: port | box to switch |
| | upack | none | switch to caller |
| | init | none | switch to callee |
| | teardown | none | caller to callee & callee to caller |
| | downack | none | caller to callee & callee to caller |

TABLE 1-continued

Message Types According to Call Protocol of Invention

| Phase | Message Type | Data Fields | From/To |
|---|---|---|---|
| status messages | busy | initiator: DN | callee to caller |
| | alerting | initiator: DN | callee to caller |
| | answered | initiator: DN | callee to caller |
| | quiet | none | callee to caller |
| | unobtainable | unallocated: String | switch to caller |
| | dialtone | none | callee to caller |
| | flash | none | callee to caller |
| | DTMF | dialed_char: Char | caller to callee and callee to caller |
| | ... | ... | callee to caller &/or caller to callee |

The setup and teardown phase messages are concerned solely with the connection and disconnection of calls.

The other messages are status messages, used to communicate between call participants after the setup phase and before the teardown phase begins. Some messages travel only from a callee to a caller, while others can travel in either direction. The types of status message shown are of basic utility in most telecommunication systems, and additional message types and data fields can be freely defined for the purposes of particular features.

Among the types shown, busy, alerting, answered, quiet, unobtainable and dialtone are of particular importance: they are the status messages that a receiving LI box must translate into audio tones (or silence) on the external line to the customer's telephone, as described above. DTMF and flash status message originate at a LI box when the customer dials a digit or flashes the switchhook while a call is in progress.

The protocol for calls to be executed by boxes is in three parts: a protocol for the caller port, a protocol for the callee box; and a protocol for the callee port. The protocol executed by the switch is as follows.

Each protocol is described below in the language of Promela, known in the art (see, e.g, G. J. Holzmann, "Design and Validation of Protocols: A Tutorial", *Computer Networks and ISDN Sytems XXV*:981-1017, 1993, incorporated by reference). A message of type msg is sent on channel out by the statement out! msg. A message of type msg is received on channel in by the statement in?msg. The statement in?msg(x) receives the message and assigns its data value to the variable x. An if statement is executed by executing exactly one of its alternatives; in these protocols an alternative is executable if it is guarded by a true condition, by a send statement of by a receive statement for a message that is available as the next message on the channel. A do statement is like an if statement except that it continues to execute alternatives until there is an explicit exit from the loop by means of a break or goto statement.

A caller port on a box is capable of making a sequence of calls. Each of its calls must satisfy the following protocol:

```
begin: out!setup; goto requesting;
requesting: if
::in?upack; goto linked
::in?quickbusy; goto end
fi;
linked: do
::out!status
::in?status
::out!teardown; goto unlinking
::in?teardown; out!downack; goto end od;
unlinking: do
```

```
::in?status
::in?teardown; out!downack
::in?downack; goto end
od;
end: skip
```
A callee port on a box is capable of receiving a sequence of calls. Each of its calls must satisfy the following protocol:
```
begin: in?init; goto linked;
linked: do
::out!status
::in?status
::out!teardown; goto unlinking
::in?teardown; out!downack; goto end
od;
unlinking: do
::in?status
::in?teardown; out!downack
::in?downack; goto end
od;
end: skip
```
A dual port can participate in a sequence of calls. During each call it plays the role of either a caller port or a callee port. Any port is busy when it is in a requesting, linked, or unlinking state, and idle otherwise.

The history of a box and its own signaling channels (those not associated with particular ports) must conform to the following callee box protocol:
```
begin: do
:: in?setup;
   if
   ::out!reserve
   ::out!quickbusy
   fi
od
```
If the box sends a reserve message, it must be accompanied by the identifier of an idle, unreserved callee or dual port. That port must remain idle and reserved until it receives its init message from the switch, at which time it becomes busy and unreserved.

In terms of network switching, the corresponding protocol to be observed by the switch 20 is more complex because it must take account of the interleaving of many calls and of the connections between them. In the protocol given below, it is assumed that:

There are four arrays of signaling channels p_s, s_p, b_s and s_b used respectively for sending out-of-band messages from a port to the switch 20, from the switch 20 to a port, from a box to the switch 20 and from the switch 20 to a box. They are indexed by port and box identifiers ([p] and [b]). Each channel is an unbounded reliable FIFO queue.

The switch 20 procedures CONNECT[p,q] and DISCONNECT[p,q] respectively create and destroy a voice path between ports p and q. The order of operands is immaterial.

The function ROUTE: b returns the box identifier b of the destination box for the most recently read setup message, determined by the router as described above.

The switch 20 reads its input channels fairly (in some reasonable sense), and is fast enough to ensure that no call suffers any significant degree of starvation.

The switch 20 maintains internal variables whose values represent the connection state:

Current out-of-band signaling connections between ports are represented by elements of an array WTF ("where to forward"). If ports p and q are currently connected in a call then WTF[p]=q and WTF[q]=p. If port p is not currently connected to any port then the value of WTF[P] is not defined.

The array TDF has an element for each port, this array is used in the processing of teardown and downnack messages. Initially the value of TDF[p] is 0 for all p.

There is an array of queues containing a queue for each box b. The queue for a box holds the port identifiers of senders of setup messages that have already been sent to the box but for which the switch 20 has not yet received a reserve or quickbusy message from the box. The operation ENQ[x,b] and the function DEQ[B]: p have the logical meanings.

In the illustrative protocol there is a departure from strict Promela format in three minor ways. First, the use of parentheses rather than square brackets in the notation
```
::p_s(p) ?msg; ... p ...
```
occurring in a looping or conditional statement is a shorthand for
```
::p_s[p1] ?msg; p=p1; ... p ...
::p_s [p2] ?msg; p=p2; ... p ...
::p_s [p3] ?msg; p=p3; ... p ...
```
and so on. The syntax is reminiscent of
```
::b_s[b] ?reserve(y)
```
in Promela, which assigns to y the value of the data field of the reserve message. The same effect can be achieved in strict Promela with a slight loss of readability. Second, arrays are indexed by arbitrary box and port identifiers; in strict Promela array index values must be integers. Third, unbounded queues are assumed.

The protocol is:
```
/* switch protocol; initially TDF[p]=0 for all ports p */
do
::p_s (x) ?setup; b=ROUTE; ENQ[x,b]; s_b[b] !setup
::b_s (b) ?quickbusy; x=DEQ[b]; s_p[z] !quickbusy
::b_s (b) ?reserve(y); x=DEQ[b];
   if
   ::TDF[y]==0
   ::TDF[y]==1; z=WTF[y];
      do
      ::p_s[y] ?status; s_p[z] !status
      :: p_s[y] ?downack; s_p[z] !downack; TDF[y]=0;
         break od
   fi;
   CONNECT[x,y]; WTF[x]=y; WTF[y]=x; s_p[x]
   !upack; s_p[y] !init
::p_s(x) ?status; y=WTF[x]; s_[y] !status
::p_s(x) ?teardown; y=WTF[x]; s_p[y] !teardown; TDF
   [y]=1;
   if
   ::TDF[x]==1
   ::TDF[x]==0; DISCONNECT[x,y]
   fi
:: p_s(x) ?downack; y=WTF[x]; s_p[y]!downack; TDF[x]
   =0 od
```
TDF[y]==1 when (and only when) the switch 20 has sent a teardown message to y and has not yet received the corresponding downack message from y; at all other times TDF[y]==0. The global initialization TDF[p]=0 for all ports p is necessary to ensure that if a port y is the callee in its first call, then TDF[y]==0 is correctly set when the reserve (y) message for that call arrives at the switch. At the completion of every call of port y the value of TDF[y] is guaranteed to be 0: for a call in which y has received a teardown message, the assignment TDF[y]=0 is executed when the downack sent by y is received at the switch 20; for a call in which y receives no teardown message, the value of TDF[y] is unchanged from the global initialization TDF[y]=0 or from the completion of y's preceding call.

When a reserve (y) message is received by the switch 20, port y must be idle, since otherwise its box would not have selected it to receive a call. Therefore it must have received all its incoming messages and written all of its outgoing messages of its immediately preceding call c (if there has been such a call). However, there may be some messages of call c on the p_s[y] channel that have been sent by y but not yet received by the switch. If TDF[y]==1, then port y has been sent a teardown message in call c, but its acknowledgment downack has not yet been received by the switch. The signal channel p_s[y] from y to the switch must then be "cleaned", because it is still in use from call c. If TDF[y]=0, then the channel p_s[y] must be empty. Either the switch 20 has already received a downack from port y; or else port y has itself already received a downack, in which case the final message of p_s[y] was the teardown of which that downack was the acknowledgment.

The first teardown message of a call received by the switch 20 causes the switch 20 to disconnect the voice path. When a teardown message arrives from port x, the guard TDF[x]==0 correctly specifies the condition that this is the first teardown message of the call to pass through the switch 20. For if TDF[x]==0 because port x has already received a teardown message and its acknowledging downack has already reached the switch 20, then that downack would have preceded the teardown message that has just arrived, contrary to the port protocol.

A feature box and its ports must observe the signaling protocols described above, and must send only correctly formed messages as described herein. The internal voice-processing behavior of a box will be described here. In a legal box state the external output of each port is exactly one of these four alternatives: (1) silence, (2) the external input from another port of the box, (3) the normalized sum of the external inputs from a set of other ports of the box, or (4) a specified sound such as a tone or announcement.

In addition, the external input from a port can be recorded or analyzed for recognition of a specified kind of pattern. Recording and analyzing port states are not mutually exclusive or exclusive of any port-output state. A language for box programming in the invention is conceivable, and its necessary features will be apparent to persons skilled in the art and therefore not described in great detail here. In general such a language must make all legal voice-processing states achievable. The language commands for creating active port states must specify certain information. For instance, a record command must specify where the recording is to be stored. A play command must specify the sound to be played; the sound might be given as a tone frequency, a recording, or even as text (in the presence of text-to-speech facilities). An analyze command must specify the kind of pattern to be recognized and the place where the result of the recognition is to be stored. The kind of pattern is usually specified in terms of a vocabulary. In the presence of automated speech recognition this will typically be a vocabulary of single word commands.

In addition to these commands, a convenient box-programming language suitable for implementation of the invention should provide events through which a program can be notified of the status of ports in active states. It should be possible to notify a box program that an announcement of fixed duration has been played completely. It should be possible to notify a box program that recording has been completed, where completion might be defined in terms of a maximum recording time or a minimum interval of silence. It should also be possible to notify a box program that recognition has been completed, where completion might be defined in terms of a maximum sequence length of recognized words, a minimum interval of silence, or recognition of a distinguished "interrupt" word. While these functions are made note of in terms of a language tailored to the network architecture of the invention, it will be appreciated that other special or general purpose programming languages can also be used to code and carry out different aspects of the invention.

The specification of various illustrative call features according to the invention will next be described, the features and their combinations being chosen to illustrate various aspects of the inventive architecture and its implications. The suggested specifications are not intended to be complete or definitive: they are intended only to illustrate possible approaches to implementation of selected features of the invention.

Null Box

First, description is made of a null feature box. It is completely transparent: its presence has no effect on any network usage into which it is configured. Its description should be thought of as that of a process executing in parallel with the protocols on the active ports and sharing events with them.

The null feature box has a callee port p1 and a caller port p2. It becomes occupied on receiving a setup message; it accepts the call on p1. It then places a call on p2, using a copy of the setup message of the p1 call (changing the value of command to "continue" if necessary). If the p2 call attempt fails, it sends a busy status message followed by a teardown message on p1, and becomes available on receiving the corresponding downack. If the call on p2 succeeds, it enters the transparent state: that is, it joins the voice channels of p1 and p2, and proceeds to copy all incoming out-of-band signals from each port to the other. When the teardown subprotocol on both ports is complete the box enters an end state and becomes available again.

Target Identity: 800-Service. Speed Calling and Call Forwarding Always

Three features that change the target of a subscriber call are Speed Calling (SC) 800-service (800) and Call Forwarding Always (CFA). Each is provided by a feature box which is like the transparent box with one exception. To place the p2 call, it uses an altered copy, not a true copy, of the setup message of the incoming call on port p1. In each case the target field is altered, and the value of command is "update" with a modifier {"Target"}, ensuring that the target zone of the route will be recomputed.

The 800-service feature allows a commercial subscriber to pay for all incoming calls; the calls are placed by dialing an easily remembered string such as 1-800-1234567. The feature is a dialed zone feature: the string is not a DN, and the 800 feature box determines the required DN from its operational data relation:

eightDN: String800⟶DN

The altered value of target is eightDN (dialed), or nul if dialed ∉dom eightDN.

The SC (Speed Calling) feature is a source zone feature. It uses an operational data relation sourceSpeedDN: DN⟶(SpeedCode⟶DN);

This relation contains each source subscriber's private mapping from speed-calling codes to frequently called DNs. The altered value of target is nul if source a dom sourceSpeedDN or if dialed ∉dom sourcespeedDN (source); otherwise it is sourceSpeedDN (source) (dialed).

Call Forwarding Always (CFA) is a target zone feature. It uses an element of an operational data relation aForwardDN: DN→DN;

This relation maps the target subscriber's DN to aforward DN. The altered value of target is aForwardDN (target), or nul if target∉dom aForwardDN.

Target Identity: OCS

OCS (Originating Call Screening) is a source zone (Z1) feature. Its function is to prevent calls to barred numbers on a screening list maintained by a subscriber to the feature. Subscribers enter their barred numbers as strings (DN is a proper subset of String). The operational data is:

screenOCS: DN↔String

For each number s barred by source, screenOCS has an element (source, s). The key choice in specifying OCS is: Which fields of which messages are candidate values of s? Three possible answers are as follows:

Dialed in the setup message. In this case dialed speedcall codes and 800-numbers can be barred, but forward DNs reached by CFA can not: a disobedient child whose parents have barred DN1 simply asks a friend at DN2 to forward DN2's calls temporarily to DN1, and then dials DN2.

Target in the setup message. In this case only DNs occurring in setup messages in the source zone can be barred. 800-numbers can not be barred even if their equivalent DNs are known (because 800-numbers are not DNs and do not appear in the target field; they are translated to DNs by the 800 box in the dialed zone, too late for OCS to operate). Forward DNs can not be barred (because CFA is in the target zone, and the forwarding is similarly too late). DNs accessed by speed-calling codes can be barred provided that OCS has a later precedence than SC: if the OCS feature box precedes the SC box then OCS receives the dialed string before SC has translated it to a target DN.

Initiator in an alerting or answered message. In this case it is the DN of the LI that is finally reached that is subject to barring by OCS. Forward DNs are barred. But an 800-number can not be barred unless its equivalent DN is known to the subscriber and entered explicitly in the screening list.

By suitable design of the feature box, OCS can be specified to enforce barring of any or all of these fields. If the setup message received at port p1 is barred neither because of its dialed nor by its target value, the p2 call is placed with the same setup message. If the p2 call is successful, an alerting or busy message from the LI finally reached will eventually be passed back by transparent behavior on the part of other feature boxes, and can be checked for a barred initiator value.

Joining Usages: Call Waiting

The Call Waiting (CW) feature allows a subscriber to receive an incoming call while already engaged on an existing usage. The subscriber can switch to the new call by flashing the switchhook, and back again to the earlier call by flashing again. CW is both a source zone (Z1) and a target zone (Z3) feature, because the subscriber may be either the caller or the callee in the existing usage. It must be provided by a bound box, because clearly the second, incoming, call must be routed to the CW box already configured into the existing usage.

Before the second call is received, the CW box behaves transparently. It receives a call, either from the subscriber or from another source. If the call is from the subscriber (in which case the source value in the setup message is the subscriber's own DN), the call is accepted on port p1 and a call placed on port p2 with the same setup message field values. If the call is not from the subscriber the call is accepted on port p2 and a call placed on port p1. Both p1 and p2 are dual ports.

The CW box has a third port p3, which is a callee port. If a call arrives at the box while the p1 and p2 calls are still active, it is accepted at port p3, an alerting signal is sent from port p3, and the call-waiting indication (two short tones) is played on the outgoing voice channel of port p1, the speech signal being temporarily interrupted for the purpose. The box then waits for one of the following events:

A teardown message on the port p1. The box tears down all the calls and enters its end state.

A teardown message on another port. The box tears down the call on that port, connects port p1 to the remaining port if it is active and was not already connected, and is now ready to receive a call on the port that has become free.

A flash message on port p1. The box disconnects p1 from the port to which it is connected, and connects it to the other port, provided that there is an active call on that other port; if not, the flash message is passed on to the connected box but is otherwise ignored.

In this way the CW box allows the subscriber to multiplex between two calls. Notice that CW does not require an internal three-way connector, because its two calls are multiplexed, not conferenced.

Splitting a Usae: 3-Wav Calling

3-Way Calling is a feature in both source (Z1) and target (Z3) zones, provided by a free box with two dual ports p1 and p2 and one caller port. Like CW, the box connects the subscribing customer on port p1 when first activated. It allows the subscriber, when already engaged in a usage, to make a second, outgoing, call and to conference the two calls together. Like CW it uses flash messages to signal the subscriber's intentions. A flash while only one call is active indicates that the subscriber wishes to make a second call. The 3WC box then put the existing customer call on hold, sends a dialtone message to port p1, collects a dialed string in-band from digits dialed by the subscriber, and places the dialed call on the currently free port. When that call has been set up and the subscriber flashes again, the box conferences the two calls, joining the voice signals at all of its ports at an internal three-way connector. A teardown message on p1 ends all calls and returns the box to the end state, where it becomes again available. A teardown message on another port makes that port available for use in another outgoing dialed call when the subscriber flashes again.

CW and 3WC Together

The complexity of the interaction between the CW and 3WC features is well known in the art. In the invention two possible relative precedences can be considered quite directly in terms of the usage configurations that can occur. FIGS. 3(a)-(e) show some configurations. As shown in that figure, if 3WC takes precedence over CW, then the configuration shown in FIG. 3(a) arises when the subscriber has used 3WC to flash and make a second call while one is already in progress. Because CW is a bound box, there can be only one CW box for this LI box; therefore the second call does not go through a CW box. Evidently, if the other party of the first call hangs up, there will be no CW box remaining in the usage of the second Modifying an active usage—for example, by splicing in a CW box—is not permitted in the architecture of the invention. Thus giving 3WC precedence over CW gives rise to a serious anomaly: use of 3WC can deprive the subscriber of the CW functionality.

Figure 3A:
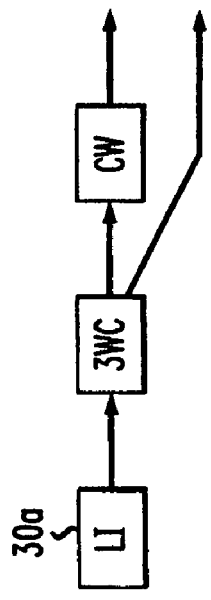
FIGS. 3(a)-3(e) illustrate configurations according to the invention of a telecommunications network deploying call waiting and 3-way calling.
Figure 3B:
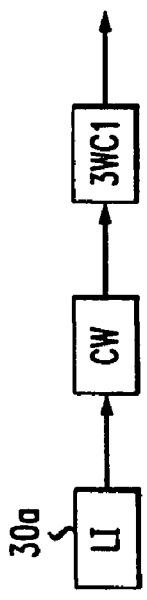

FIG. 3(b) shows the initial configuration of an outgoing call when the opposite precedence is applied. The arrival of a further incoming call then produces the configuration shown in FIG. 3(c), in which there is a 3WC box in each of the two calls. Since 3WC is not a bound box, there is no reason why there should not be one in each call, as shown. The subscriber can then switch between the two calls by flashing, but the 3WC functionality is apparently inaccessible: while the CW box is handling two calls it will absorb any flash message, interpreting it as a command to switch between those two calls.

Figure 3C:
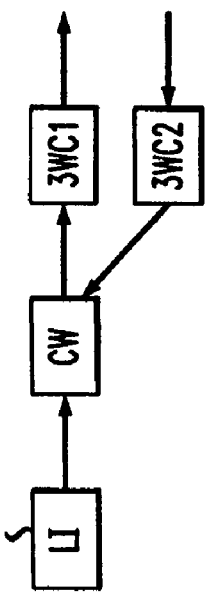
Figure 3D:
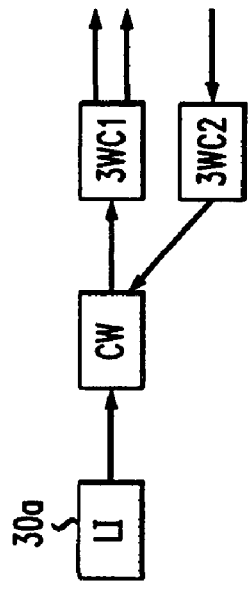
Figure 3E:
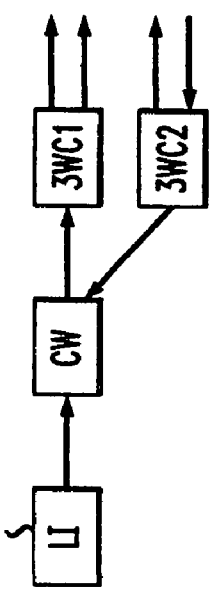

It is possible to overcome this difficulty by a small adjustment to the behavior of the CW box. If two flashes occur close together, in the manner of a double click of a mouse, the CW box acts on neither, but copies one to the signal channel of the currently connected call. Thus if the subscriber in the configuration in FIG. 3(c) is talking to the callee on 3WC1, a double flash will allow a further call to be dialed through 3WC1, resulting in the configuration shown in FIG. 3(d). A further double flash will conference together the two calls on 3WC1. A single flash will now reconnect the callee on 3WC2, and a double flash will allow a fourth call to be dialed through that box, resulting in the configuration shown in FIG. 3(e).

It is possible that such an interface would be too hard for many subscribers to operate comfortably. The point is that the usage configurations that can arise in the invention allow the issues to be exposed and managed in this kind of way.

Direct Routing Command

Figure 4:
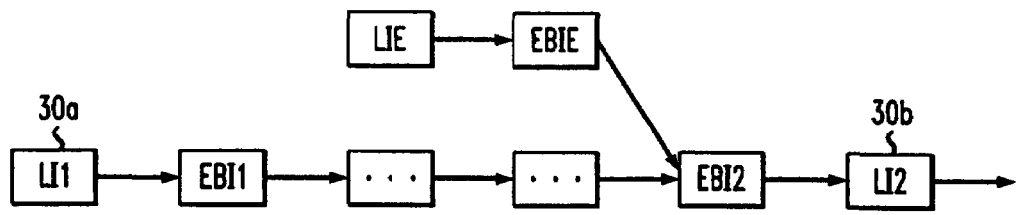
FIG. 4 illustrates direct routing according to the invention.

The Emergency Break-In feature (EBI) makes use of the direct routing command in the setup message. An emergency caller, such as a fire department, subscribes to EBI as a source feature. The EBI source box, perhaps after checking the user's authorization, places a call with a direct routing command. The configuration that results when the callee subscriber is already engaged in a usage is shows in FIG. 4.

A customer call is connected between the subscribers at LI1 30a and LI2 30b. Both LI1 30a and LI2 30b have bound EBI boxes. The emergency service places an emergency call to the subscriber at LI2 30b; this call is routed directly from the EBIE box of the emergency service to the EBI box bound to LI2 30b, and that EBI box accepts the call and places the call from LI1 30a on hold. Evidently a regular subscriber's EBI box must have the highest precedence, ensuring that it is immediately adjacent to the LI box to avoid potential interference from other features.

Interactions Arising from In-Band Signaling

The use of voice recognition and other in-band signaling can give rise to awkward interactions. Whereas a feature box can absorb out-of-band signal and prevent it from reaching other boxes simply by not passing it on, it can not absorb an in-band signal in the same way unless it has previously disconnected the voice channels.

A technique that can be used in the invention is to inhibit recognition of in-band signals by sending out-of-band messages to indicate to other boxes that they should not recognize certain in-band signals until further notice. Call connection between adjacent boxes in a usage uses a pair of voice channels, one in each direction. When a box is about to monitor the signal arriving on an incoming channel from an upstream box, it sends an inhibit message to its neighbor or neighbors in the downstream direction. When it ceases to monitor the signal it sends a complementary uninhibit message in the same direction. If all boxes observe the logical discipline, each allowing a box for which an inhibit is received to take precedence in monitoring voice signals from the corresponding direction, the in-band signaling difficulty can be overcome.

This technique allows the same precedence to be enforced for in-band signals as for out-of-band signals. It is also possible to enforce the opposite precedence or even a mixture, at the cost of some complexity and reduction in feature independence. To establish such a technique requires a taxonomy of in-band signals, and the definition of field values in the inhibit and uninhibit messages to represent the signal classes.

Addressable Boxes and Dialed Features

Addressable boxes are used only where all users who dial a given DN must be connected to the same box. By contrast, a dialed feature is merely one that is applied according to the dialed string. Two contrasting examples will make the point clearer.

800 Service (800) is a dialed feature, configured into any usage in which the dialed string begins with the characters '1-800'. But it is not an addressable box: each call dialing an 800 number is routed to its own 800 box, which determines a target DN from the operational data of the feature—namely, the relation recording the mapping from 800 numbers to DNs. To make 800 an addressable box would mean having one feature box for each 800 number, and routing all calls to the number through that particular box. While this scheme would have the advantage that the box could contain the maplet for the number, and so would not need to access operational data, this scheme would have a weightier disadvantage: it would require the box to have enough ports to serve as many customers as could be calling the 800 number at any one time and a corresponding box program able to handle the interleaving of their call protocols.

By contrast, Large-Scale Conferencing (LSC) requires the use of a number of addressable boxes. When a conference is booked, a box of sufficient size to accommodate all participants is assigned. Participants who will take the initiative in joining the conference are given this number to call, while other participants may wait for the box to call them and so will not need to know the number.

Disconnected Boxes

Some features are provided by boxes that are temporarily disconnected from all other boxes while engaged in their tasks. Consider, for example, a Wake-Up Call service (WUC). WUC is a dialed feature provided by a free box. On receiving an incoming call the box collects the caller's DN and the desired wake-up time from the caller in local variables. It then tears down the call, and waits until the wake-up time is indicated on the real-time clock to which it has access. During this period of waiting, the box is not connected to any other box; but it is occupied, and not available to service another wake-up call. At the expiration of the period it places the wake-up call to the subscriber DN stored in its local variable.

The foregoing description of the invention is illustrative, and variations in configuration and implementation will occur to persons skilled in the art. For instance, the illustrative embodiments have adopted certain simplifying, but not unreasonable, assumptions in order to clarify and focus essential aspects of the inventive system and method. Lifting the assumptions would not invalidate the architecture of the invention, but merely introduce additional detail that could obscure, but not frustrate, associated core ideas. Refinements in configuration, extension and related implementation issues include the following.

Multiplexing interfaces. Some telephones (usually supported by an ISDN line or PBX) have multiple buttons for time-multiplexing among several calls. They also have buttons for functions such as conference, transfer, drop, and hold. These functions are closely related and depend on each other's states. To work well, a multiplexing user interface should be a single feature smoothly integrating all these functions. Such a feature would require a feature box configuration that is more complicated than those previously discussed, but not different in fundamental architecture.

Multiple directory numbers. In discussion above a one-to-one correspondence between assigned DNs and things to which DNs can be assigned (line interfaces and addressable feature boxes) was required. This is more restrictive than necessary, since the DN-to-box mapping can be many-to-one. Assuming that DN assignments are still made through provisioning, the adaptation is negligible, since there is really nothing to do but allow the DN-to-box mapping to be many-to-one.

Multiple DNs are convenient for some addressable boxes. For example, a box providing network queuing for a large 800 subscriber might have two DNs. One is the target of 800-number translation, so it is used by customers seeking service. The other is dialed by service agents reporting to work. The box does port selection according to the DN used, then matches unserved customers at "public" ports with idle agents at "private" ports in FIFO order.

Another application of multiple DNs is a personal-mobility service such as AT&T's commercially available "500" service. In addition to the DNs that uniquely identify line interfaces, there are 500 numbers that subscribe to their own features and are associate more dynamically with line interfaces. Note that the set of features that a 500 DN can subscribe to will be different from the set of features that a "normal" DN can subscribe to.

Trunk interfaces. All practical telecommunications systems have external trunks as well as external lines. Fortunately, trunk interfaces are quite similar to line interfaces. They perform similar functions and, like line interfaces, must be written to interface the DFC internal call protocol with a specific external protocol. As with multiple DNs, necessary extensions in implementing the invention are minor. The mapping from DNs to trunk interfaces is many-to-many. The route can choose any trunk interface associated with its target DN, provided that the chosen trunk interface is currently available. (Like free feature boxes, trunk interfaces can be occupied or available, and the DFC implementation must keep track of which is which.)

Only a few more minor changes are needed to allow a remote-access DN (one that the system reaches through trunks) to subscribe to features implemented by bound boxes. The combination of bound boxes and remote access is paradoxical however, and it is assumed that no such combination is attempted.

The inventors are aware of the ancillary problem of trunk glare, but this phenomena has little to do with features or feature interaction as considered in the invention. Glare occurs when the two switches at the two ends of a trunk both seize the trunk for an outgoing call, thinking that it is idle. Both switches are aware of the condition, because both receive setup messages when they expected setup acknowledgments. Typically a static priority scheme is used to choose a winner, and the loser retracts its setup. For this reason it is left to design choice in the implementation of the architecture of the invention.

Complex voice connections. In addition to the ordinary functions of connecting any pair of ports and conferencing any set of ports, voice processing within boxes can do more unusual things. FIG. 7(a) shows a box in which the input voice signal at port P1 is being broadcast as the output voice signal at both ports P2 and P4. FIG. 7(b) shows a box whose three ports are connected externally to a customer, a novice service agent, and a coach who is teaching the service agent. The "M" nodes are mixers. The customer hears only what the agent is saying. The coach hears the full conversation between the agent and the customer. The agent hears both the customer and the coach's instructions.

Dialing and dialtone features. One example of a dialing feature is Voice Dialing (VD), in which a person speaks the digits of the DN. Voice Dialing is sometimes useful as a substitute for DTMF tones when attempting a call from a dial-pulse or foreign telephone. Another example of a dialing feature is Easy voice (EV), in which a person speaks a phrase such as "call mother;" this phrase is recognized and used as a key into a customized directory. An example of a dialtone feature is Message Waiting Indicator (MWI), which, on an analog telephone, indicates the presence of voice messages by providing a special dialtone.

These features cannot be specified with an analog line interface as described above, which places its first DFC call after playing dialtone and collecting a string of DTMF characters. However, a slight adaptation to the analog line interface permits dialing and dialtone features. The interface must make its first DFC call immediately after receiving the offhook signal from an idle telephone. This call has null entries in both the dialed and target fields of the setup message.

The new routing command of this first DFC call will thus produce a route with all the source-zone features and no others. Dialing/dialtone features must have earlier precedence than most other source features, so suppose for example that the route begins with the following dialing/dialtone features: MWI, VD, EV, TT. There must always be a default dialing feature, which in this case is Touch-Tone Dialing (TT), and the default must always have the latest precedence of any dialing/dialtone feature.

When the MWI box receives its call, it sends a dialtone status message-special or normal-to the line interface, and make a transparent outgoing call. The VD and EV boxes behave similarly, but their later dialtone messages will be ignored by the line interface. The TT box also sends a dialtone status message but does not, because it is the default dialing feature, make an outgoing call yet. At this point the usage looks like FIG. 8(a).

Now, VD, EV and TT monitor their inputs in parallel until one of them recognizes what it considers to be a complete dialing input (also, any box can send a quiet status message to the line interface to stop dialtone when it recognizes the beginning of a dialing input). That box disconnects its downstream call, if any, removing all downstream dialing boxes from the usage. It then makes a new outgoing call with a real dialed string and an update command to cause the router to add dialed- and target-zone features to the route. For example, if EV succeeds and the first two non-dialing source-zone boxes are the free two-port boxes $S_1$ and $S_2$, then at some point the usage will look like FIG. 8(b).

To be safe, it must be ensured that no upstream dialing box succeeds subsequently (static analysis should ensure that no two dialing boxes can ever succeed simultaneously, i.e., on exactly the same signals). Dialing boxes may be programmed to go transparent when they receive a cancellation status message from a downstream dialing box, or to go transparent when they receive a busy or alerting message from downstream.

Difficult Feature Interactions.

When DFC technology according to the invention is working best, features can be specified independently, yet interact in precisely the desired ways. Yet, due to the complexity of the feature interaction problem there are may remain isolated instances still presenting complications. Thus, occasionally in the practice of the invention it is possible that a group of features must be explicitly designed to cooperate with each other, and feature modularity would compromised to that extent. The following examples show how explicit cooperation can be incorporated in the architecture of the invention.

Caller identification and caller-identification blocking. Caller ID is implemented by a target-zone (Z3) box that extracts source information from its incoming setup message, and makes it available to the user of a ringing telephone in whatever way the equipment allows. Caller ID is implemented by a source-zone (Z1) box that checks for per-call selection, if applicable, and signals all CallerID boxes to cease and desist.

Clearly this requires explicit cooperation between feature boxes of these two types. A CallerID box cannot signal a CallerID box by means of a status message, because the message might arrive after the CallerID box had already sent information to the telephone. The "blocking bit" has to be an extra field of the setup message, which is extensible just as the set of status messages is.

Call waiting and three-way calling. It is well known that these two features interact because they both use flashes as their control input. Some discussion above explored the ramifications of expanding the control vocabulary of the invention slightly. Now the problem is returned to in its original form.

To implement the most desirable user interface the inventors are aware of, it is sometimes necessary to give CW priority access to a flash, and sometimes necessary to give 3WC priority access to it. For reasons explained above, a CW box must always be closer to its line interface than a 3WC box. Thus, the flow of signals from an interface box to CW and then 3WC is sometimes with the priority order and sometimes against it. Since the signaling patterns in this example recur in other cases, a general characterization of the problem and a general solution to it are given.

The general problem concerns contention by two boxes F and H for signals of the same type s from the same line or trunk interface I. Among other properties, it is desired to ensure that each signal of type s is responded to by at most one box. There are four cases, solutions to which are shown in FIG. 9.

Figure 9A:
FIGS. 9(a)-9(d) illustrate another set of further usage configurations according to the invention.
Figure 9B:
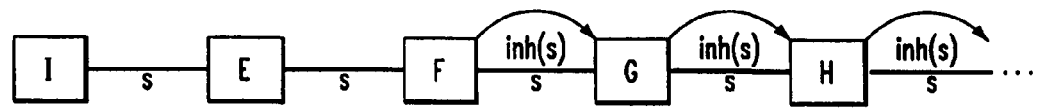

FIGS. 9(a) and 9(b) illustrate the easier case of giving priority to the upstream box F. In FIG. 9(a), s is an out-of-band signal (status message). The status message is simply absorbed by F when F is in a state that is responsive to it (as shown in the figure), and forwarded by F when F is in a state that is indifferent to it. In FIG. 9(b) s is an in-band signal, and is therefore present on all segments of the voice channel almost simultaneously. When F enters a state that is responsive to s, it sends an inhibit(s) message downstream to inhibit other boxes from recognizing and responding to s. When F enters a state that is indifferent to s, it sends a canceling uninhibit(s) message downstream.

These first two cases are naturally accommodated by the invention, and entail no loss of feature independence. For an upstream box to give priority to a downstream box, however, there must be explicit cooperation between the two. These cases are illustrated by FIGS. 9(c) and 9(d).

Figure 9C:
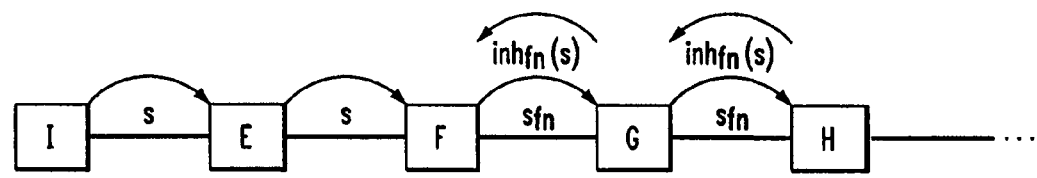

FIG. 9(c) is like FIG. 9(a) in that s is a status message. When H is responsive to s and takes priority over F, it sends an inhibit(s) status message to F; F cooperates by forwarding s even if F is responsive to s at that time.

The adaptation in FIG. 9(c) is keeping the private conversation between F and H private. To this end, all status messages are in these boxes' private code, here indicated by an fh subscript. The status message s fh is meaningless to G, even if G is interested in and responsive to status messages of types. F does not forward the $\text{inhibit}_{fh}(s)$ message upstream because it is a private signal between F and H, and therefore meaningless upstream.

Figure 9D:
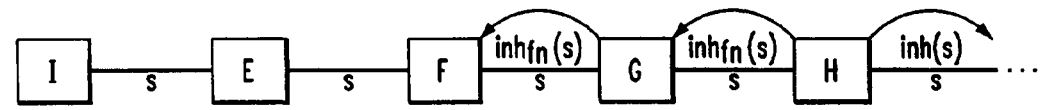

FIG. 9(d) is like FIG. 9(b) in that s is an in-band signal. H's actions to seize priority access to s are a combination of cases FIGS. 9(b) and 9(c). As in FIG. 9(b), it must inhibit all boxes downstream of it from recognizing and responding to S. As in FIG. 9(c), it must send a private signal to F asking it not to respond to s, and F must agree to cooperate.

The advantage to these solutions is that, because there is no handshaking, there is no danger of deadlock if F or H should be missing from the usage. On the downside, they may be prone to race conditions, but here the races are between the DFC implementation and the user who is doing something to produce signal s. In contrast, the race between a CID box's processing of a set message and the arrival of a status message from a CIB box would be a race between two parts of the implementation.

Remaining simplifications or other implementation aspects of the illustrative embodiments include:

Billing. Billing is not discussed. However, the architecture of the invention should offer a helpful environment for specifying billing features.

Provisioning. Provisioning, either of subscription data or of feature operational data, is not addressed. Apart from the additional detail involved, there are issues of coordination between provisioning and operation, however those issues are not more difficult to handle in the invention than in conventional network topologies.

Contention. The absence of resource contention is assumed. Although feature boxes are freely conceived as containing dedicated devices such as conference bridges and signal processors, it is assumed that boxes are always available when needed. The same assumption is made about signaling and voice channels.

Broadband. Broadband and multimedia telecommunications services have not been touched upon.

These implementation details aside, an overall structural advantage of the system and method of the invention is in the choice of an architecture in a dynamic pipe-and-filter style, with the benefits that this brings. One important advantage already mentioned is the ease with which non-linear usages can be handled and represented in graphs. The dynamic configuration and reconfiguration of a usage can be complex. For example, FIGS. 5(a)-5(c) shows a progression through three configurations.

Figure 5A:
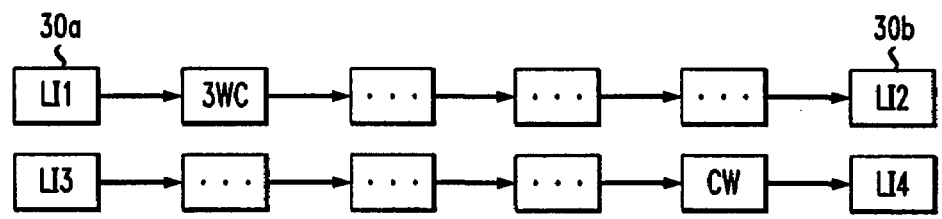
FIG. 5(a)-5(c) illustrate other usage configurations according to the invention.
Figure 5B:
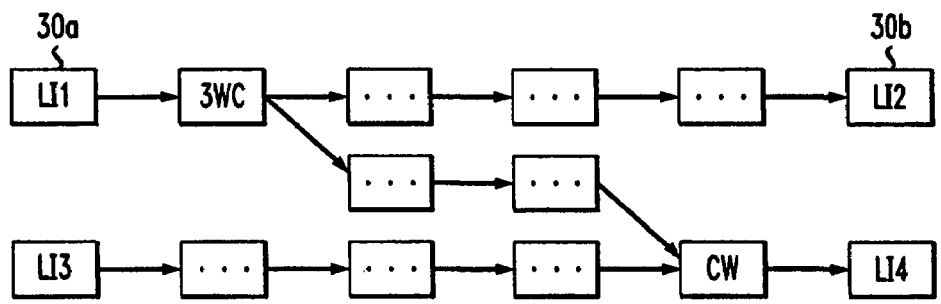
Figure 5C:
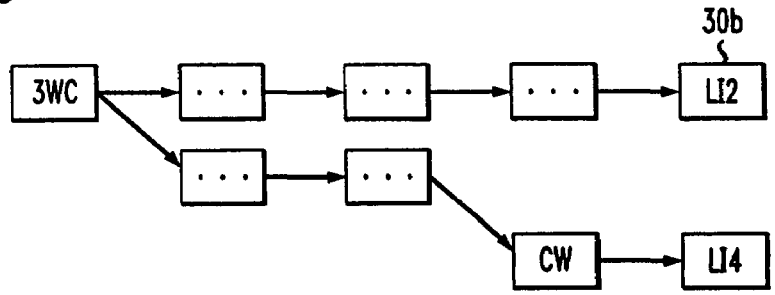

In FIG. 5(a) there are two clearly distinct usages: L11 is connected to L12 and L13 to L14; in FIG. 5(b) these usages have been joined because LI1 has placed a further call to L14; in FIG. 5(c) both LI1 and L13 have dropped out, leaving LI2 connected to L14. The final connection of L12 and L14 depends on continuing use of the 3WC (three-way call) box originally introduced in LI1's call to LI2; this causes no difficulty because 3WC is a free box.

This complexity of configuration is easily handled in the invention: nothing in the inventive architecture depends on the concept of a usage or on identifying and distinguishing individual usages over time. This independence avoids reliance on the notion of a usage or of a call, which is central in some approaches. Avoiding the obscurity and difficulty of such a notion avoids many complications and restrictions that flow from it, and simplifies the specification of call feature behavior of the invention.

The invention including feature communication by internal featureless calls also offers advantages in feature specification, analysis and implementation, including a primary advantage in feature specification with a high degree of separability among features. To a great extent, at least an initial specification of a feature can be made without consideration of other features that may be present, assuming that other feature boxes in the usage are in a transparent state. (Of course, there are some general concerns that must always be taken into account. For example, any feature may find itself in a usage within whose lifetime several customer calls are placed and answered. The OCS feature, for example, must therefore be specified to check a sequence of customer calls, not just one.)

Another advantage of the invention is the clear separation between the behavior of individual features and the underlying mechanism for their composition. As pointed out above, the router 80 does not provide any feature functionality, even for features that might perhaps be viewed as essentially routing features, such as 800 Service or CFA. Equally, the individual features play no direct part in determining the routing. Their contribution to the routing behavior is at the more abstract level of indicating that further routing is to be based on a new value of the source or target field in the setup message.

A chief advantage of the invention in analysis is that interaction between feature boxes is constrained in a well understood way, analogous to the interaction between caller and callee in a traditional POTS call. Behavior of individual boxes and their interactions is susceptible to known model checking techniques (see, e.g., F. J. Lin and Y. J. Lin, "A Building Block Approach to Detecting and Resolving Feature Interactions" in L. G. Bouma and H. Velthuijsen, editors, Feature Interactions in Telecommunications Systems, IOS Press, Amsterdam, 1994, pages 86-119). Properties of the interaction of the caller and callee protocols given above with the DFC switch protocol and with each other have been checked and verified by the inventors in the Spin language (see, e.g, G. J. Holzmann, "Design and Validation of Protocols: A Tutorial", Computer Networks and ISDN Systems XXV:981-1017, 1993). The explicit treatment of voice channels in internal calls allows feature box states and behaviors to be analyzed in terms of voice processing states as well as in terms of sending and receiving out-of-band signals.

A further significant advantage of the invention therefore lies in the relatively clear mappings between a usage and a path of connections through a set of physical switches. The description of parameters of the invention has avoided choices that would be likely to be excessively expensive to implement in hardware. In particular, the constraint that source zone, dialed zone, and target zone (Z1, Z2, Z3) features are configured in that order is intended to simplify the assignment of feature functionality to physical switches or adjuncts. At the same time, implementation bias has been attempted to be avoided—in particular, feature boxes have been given the narrowest possible span. For instance, Wake-Up Call and 800 Service features are provided by free boxes available to be dedicated to individual usages, rather than by large platforms serving many usages concurrently.

In light of these and other variations in implementation and configuration of the fundamental architecture of the invention that will be apparent to persons skilled in the art, the scope of the invention is intended to be limited only by the following claims.

What is claimed is:

1. A method of routing a call through a network containing a plurality of feature modules providing discrete call features, the method comprising the steps of:
   receiving a call setup message containing a source field and a dialed string field;
   based on contents of at least the source field and the dialed string field, retrieving information about available call features;
   constructing a routing list based on the retrieved information about the available call features, the routing list including feature modules that provide the available features;
   inserting the routing list in the call setup message; and
   routing the call according to the call setup message.

2. The method of claim 1, wherein the received call setup message contains a command field specifying that a new routing list is to be constructed.

3. The method of claim 1, wherein the received call setup message contains an empty target field, the method further comprising the step of:
   assigning a value to the target field based on the contents of the dialed string field.

4. The method of claim 1, wherein the step of routing the call according to the call setup message comprises the steps of:
   truncating the routing list by removing a first head entry; and
   connecting the call to a first feature module named in the removed head entry.

5. The method of claim 4, further comprising the steps of:
   truncating the routing list by removing a second head entry;
   connecting the call to a second feature module named in the removed head entry; and
   repeating the truncating and connecting steps for remaining entries in the routing list.

6. The method of claim 1, wherein the call setup message is received from a line interface module connected to an originating caller.

7. The method of claim 1, wherein:
   the step of constructing a routing list further comprises constructing a list including a line interface module; and
   the routing step further comprises connecting the line interface module to a destination customer.

8. The method of claim 1, wherein the step of retrieving information about available call features includes retrieving subscription information of a customer.

9. The method of claim 1, wherein the step of retrieving available information about available call features includes retrieving specification data relating to call features.

10. The method of claim 1, wherein the step of retrieving available information about available call features includes retrieving configuration data relating to feature modules in the network.

11. The method of claim 1, wherein the step of retrieving available information about available call features includes retrieving feature operational data provided by a customer.

12. The method of claim 1, wherein the network comprises a subnetwork of the public switched telecommunications network, and the call setup message is received from a line interface module connected to a customer's telephone line.

13. The method of claim 1, wherein the step of routing the calls according to the setup message comprises connecting a plurality of feature modules in the network via featureless calls.

14. A switch for routing a call through a network containing a plurality of feature modules providing discrete call features, the switch comprising:
- a connection with a first line interface module for receiving a call setup message containing a dialed string field and a source field populated with an identity of an originating customer;
- a connection with a database containing information about call features available for the originating customer and the dialed string; and
- a router configured to construct a routing list based on the information about the available call features, the routing list including feature modules in the network that provide the available features, the router further configured to insert the routing list in the call setup message, and to route the call according to the call setup message.

15. The switch of claim 14, wherein a setup message received from the first line interface module contains an empty target field, the router being further configured to assign a value to the target field based on the contents of the dialed string field.

16. The switch of claim 14, wherein the router is configured to route the call according to the call setup message by:
- truncating the routing list by removing a first head entry; and
- connecting the call to a first module named in the removed head entry.

17. The switch of claim 16, wherein the router is configured to route the call according to the call setup message by: truncating the routing list by removing a second head entry;
- connecting the call to a second module named in the removed head entry; and
- repeating the truncating and connecting steps for remaining entries in the routing list.

18. The switch of claim 14, wherein the router is further configured to:
- construct the routing list to include a second line interface module; and
- route a call from the second line interface module to a destination customer.

19. The switch of claim 14, wherein the information about available call features includes subscription information of a customer.

20. The switch of claim 14, wherein the information about available call features includes specification data relating to call features.

21. The switch of claim 14, wherein the information about available call features includes configuration data relating to feature modules in the network.

22. The switch of claim 14, wherein the information about available call features includes feature operational data provided by customers.

23. The switch of claim 14, wherein the network comprises a subnetwork of the public switched telecommunications network, and the first line interface module is connected to a customer's telephone line.

24. The switch of claim 14, wherein the router is further configured to connect a plurality of feature modules in the network via featureless calls.

* * * * *